US 6,581,100 B1

(12) United States Patent
Durin et al.

(10) Patent No.: US 6,581,100 B1
(45) Date of Patent: Jun. 17, 2003

(54) SYSTEM AND METHOD FOR COMMUNICATION PARAMETER DETERMINATION

(75) Inventors: Pierre Durin, Mougins (FR); Dominique Vincent, Mougins (FR); Iyad Hadba, Newport Beach, CA (US); Michael D. Tomlinson, Aliso Viejo, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/157,209

(22) Filed: Sep. 18, 1998

(51) Int. Cl.[7] ................................................. G06F 15/16
(52) U.S. Cl. ........................ 709/230; 370/236; 375/377
(58) Field of Search .................... 709/249, 200, 709/223, 222, 230, 227; 375/222, 121, 225, 106, 130, 240, 340, 316, 220, 370, 377; 707/200; 395/275; 714/704; 364/421; 370/206, 468, 503, 56, 60.1, 507, 232, 236.2, 540; 348/521; 710/307; 340/7.27

(56) References Cited

U.S. PATENT DOCUMENTS

| | | | | |
|---|---|---|---|---|
| 4,236,209 A | * | 11/1980 | Lombardo, Jr. et al. ..... | 709/249 |
| 4,523,310 A | * | 6/1985 | Brown et al. ............... | 370/540 |
| 5,199,105 A | * | 3/1993 | Michael ....................... | 395/275 |
| 5,267,263 A | * | 11/1993 | Feezel et al. ................ | 375/220 |
| 5,282,203 A | * | 1/1994 | Oouchi ........................ | 370/232 |
| 5,357,510 A | * | 10/1994 | Norizuki et al. ......... | 370/236.2 |
| 5,544,169 A | * | 8/1996 | Norizuki et al. ......... | 370/236.2 |
| 5,630,163 A | * | 5/1997 | Fung et al. ................. | 710/307 |
| 5,631,924 A | * | 5/1997 | Callaway, Jr. et al. ...... | 375/225 |
| 5,682,147 A | * | 10/1997 | Eaton et al. ................ | 340/7.27 |
| 5,872,810 A | * | 2/1999 | Phillips et al. .............. | 375/222 |
| 5,901,191 A | * | 5/1999 | Ohno .......................... | 375/377 |
| 5,913,218 A | * | 6/1999 | Carney et al. .............. | 707/200 |
| 5,961,608 A | * | 10/1999 | Onosaka et al. ............ | 709/249 |
| 6,069,900 A | * | 5/2000 | Sonouchi .................... | 370/507 |
| 6,075,786 A | * | 6/2000 | Kunito ........................ | 370/389 |
| 6,076,175 A | * | 6/2000 | Drost et al. ................. | 714/704 |
| 6,157,689 A | * | 12/2000 | Petty et al. ................. | 375/370 |
| 6,198,785 B1 | * | 3/2001 | Flynn .......................... | 375/377 |
| 6,297,850 B1 | * | 10/2001 | Han et al. ................... | 348/521 |

OTHER PUBLICATIONS

Ayela et al, New Innovative Multimodulation Acoustic Communication System, IEEE 1994.*
Kindsfater et al, Computer–Aided Design of High Data–Rate QAM Modem circuits, IEEE 1993.*

* cited by examiner

Primary Examiner—Mark R. Powell
Assistant Examiner—Thong Vu
(74) Attorney, Agent, or Firm—Mintz Levin Cohn Ferris Glovsky and Popeo PC

(57) ABSTRACT

A parameter detection system and method, detects the receipt of a valid communication from an entity, determines the data rate of the communication from the entity, and determines other parameters of the communication from the other entity. The parameter detection circuit configures a precision time generator to provide a timing signal at the appropriate rate to sample data associated with said valid communication, and configure a receiver/transmitter with the determined parameters of the communication.

37 Claims, 8 Drawing Sheets

SYSTEM AND METHOD FOR COMMUNICATION PARAMETER DETERMINATION

BACKGROUND OF THE INVENTION

1. Field of the Invention

The present invention relates generally to communications among a processor and one or more entities, and more particularly to a system and method for determining parameters of a communication to enable set-up of a communication link.

2. Related Art

Since the advent of microprocessors, computers and processor-based systems have become an increasingly integral part of our contemporary society. In fact, the microprocessor has enabled a proliferation of new consumer-related products that play an important role in the day-to-day lives of millions of people throughout the world. For example, the realization of low-cost, relatively fast, mass-producible processors has led to the introduction of affordable consumer items such as, for example, calculators, personal computers, and electronic organizers, just to name a few.

Additionally, the microprocessor has enabled other more conventional consumer products to experience an evolution in features and capabilities, beyond those originally anticipated. In fact, numerous consumer products developed or in existence prior to the proliferation of microprocessors have been enhanced or improved by the addition of one or more processors. Such products include, for example, automobiles, telephones, appliances, televisions, stereo components, and other consumer products. This evolution has not been limited to consumer products, but has also enabled the enhancement of commercial and military products as well.

With the proliferation of microprocessors and their ability to process and handle relatively large amounts of data came the desire to share data among processors or computing systems at other remote locations. One communication device used to facilitate communications among two or more processors is the modem. The modem allows computers and processor-based systems to communicate data and other information across an analog medium such as a telephone line. To facilitate communications between processors and processor-based systems and other entities, UARTs (universal asynchronous receiver/transmitter) and USARTs (universal synchronous asynchronous receiver/transmitter) are commonly used. In order for the UARTs and USARTs to handle communications between a processor and one or more external entities, the UART or USART being used must be programmed with parameters of the communication to be established.

However, many contemporary consumer-related products are called upon to perform real-time operational functions. For example, GSM handsets may be called upon to perform real-time tasks such as location determination, network registration, user interface, call data processing, and the like. As such, asking the processor to perform the functions of detecting the communication parameters and configuring the USART would impair the processor's ability to perform the real-time functions. Additionally, the addition of a co-processor to perform these functions would require the additional cost of the co-processor to be incurred, or be more expensive in terms of chip space.

SUMMARY OF THE INVENTION

The present invention is directed toward a system and method for facilitating the establishment of communications between a processor or processor-based system and another processor, processor-based system, or other entity. Preferably, in one embodiment, the invention provides a parameter detection module that is configured to determine or detect communication parameters from a portion of a communication received from, for example, a data terminal equipment (DTE) or other entity. For example, in one embodiment, the parameter detection module detects the data rate of the communication. In another example, the communication between the processor or processor-based system and the other entity is a modem type AT compatible communication that utilizes AT modem commands. In this example application, the parameter detection module is configured to detect the baud rate of the communication and also to detect the parity and number of stop bits in the communication format being established. The parameter detection module can be implemented using hardware, firmware, or a combination thereof. In one embodiment, registers provided within the parameter detection module are capable of being reconfigured using software or firmware.

In one embodiment of this application, a reference clock is provided to the parameter detection module. The parameter detection module utilizes the reference clock to trigger a counter, which counts the number of clock pulses during a valid bit time. Preferably, in one embodiment, the valid bit time is the duration of the start bit received from the other entity. The count value obtained at the end of the bit time is compared with one or more valid bit times to determine the data rate or baud rate of the communication.

In one embodiment, this rate information is provided to a precision time generator. The precision time generator uses this determination to generate the appropriate timing signals for the receiver/transmitter. Specifically, the precision time generator provides a timing signal at the correct rate for the communication being established such that a receiver/transmitter can send data to and receive data from the other entity.

To detect the other communication parameters, in one embodiment, the parameter detection module evaluates the first one or more characters received. For example in the case of AT compatible communications, the parameter detection module evaluates the first two characters to determine which of a plurality of valid AT commands has been received. In one embodiment, the parameter detection module compares a series of received bits corresponding to one or more characters with stored bit sequences for possible valid characters to determine whether any valid characters have been received.

If one or more valid characters have been received, these valid characters are evaluated to determine the communication parameters. For example, in the embodiment where the communication is established using AT modem commands, the first two characters received in the character sequence indicate parameters such as even, odd or no parity, and the number of stop bits.

According to another aspect of the invention, the parameter detection module is reset immediately upon the completion of a message to the entity. In this manner, the parameter detection module is immediately ready to receive and detect a subsequent AT command from the entity.

One advantage of the invention is that the parameter detection module can be implemented to perform these functions without the need to implement an additional processor to set up the communication parameters. Additionally, utilizing a parameter detection module to perform these features frees the processor from having to devote a portion of its time to establishing the communication parameters.

According to one embodiment, a system for detecting and configuring the parameters of a communication between a processor-based system and another entity includes a receiver and transmitter configured to receive data from the other entity and provide the received data to the processor system, and to transmit data from the processor system to the other entity across a communication channel. A precision time generator generates one or more timing signals from a reference clock signal, which are used by the receiver/transmitter to sample received data and to output transmitted data. A parameter detection circuit, detects the receipt of a valid communication, determines the data rate of the communication, and determines other parameters of the communication. The parameter detection circuit is further configured to set up the precision time generator to provide a timing signal at the appropriate rate to sample data associated with said valid communication, and to configure the receiver/transmitter with the determined parameters of the communication.

Further features and advantages of the invention as well as the structure and operation of various embodiments of the invention are described in detail below with reference to the accompanying drawings.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

Figure 1:
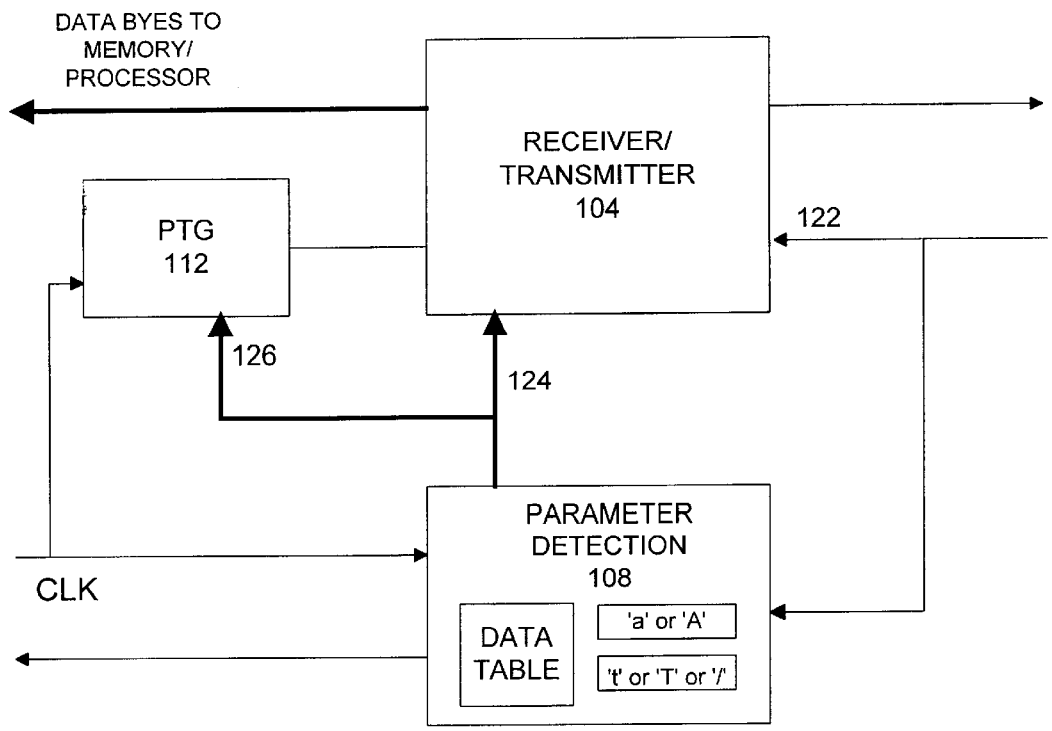
FIG. 1 is a block diagram illustrating an example application of the invention according to one embodiment.

The present invention is directed to a system and method for performing command detection, baud rate sensing and character format determination in a communication system. In one embodiment, the invention uses the detected information to program or configure a communications device, such as, for example a USART or UART to properly handle the associated communication.

With serial communications, it is desired that both serial devices communicate at the same speed. It is interesting to note that although the terms baud and BPS (bits per second) are often used interchangeably, they are not synonyms. With modems, the carrier signal is characterized by the number of signal intervals, or pulses, transmitted. Each pulse is called a baud, and the baud rate is the number of pulses or bauds per second. BPS, on the other hand is a measure of how many bits (e.g., data bits) can be transmitted during one pulse (one baud). With this in mind:

bps=baud*number of bits per baud

The two are often confused because early modems used to transmit only 1 bit per baud, so a 1200 baud modem would coincidentally operate at 1200 bps. Today, higher speeds are desired so more bits are transmitted for each baud. One technique for doing this is by quadrature amplitude modulation. Thus, although baud can equal bps, they are not necessarily synonymous.

Because a processor may send or receive data at a rate different from the entity with which it is communicating (regardless of baud rate), flow control mechanisms are often implemented. Flow control allows one device to ask the other to pause while it "catches up." There are two common types of flow control used: hardware, and software. Flow control is not necessary when the transmission speed is very slow and the devices at each end are reasonably fast. Software flow control uses data characters (e.g., XON/XOFF, or Ctrl-S/Ctrl-Q) to request the start and stop of data flow. Hardware flow control (also known as RTS/CTS flow control) uses connections in the modem cable, or hardware built into an internal modem.

A parity check can be performed to determine whether a received signal has errors. If a signal has errors in it when it is received, the receiver typically would like to know so it can ask for a retransmission of the data. A parity check works by providing an extra bit at the end of each signal. This bit is referred to as a parity bit. There are two kinds of parity: odd and even. An odd parity means that the total number of bits that have a value of 1 in a signal, including the parity bit, must be an odd number. Similarly, an even parity is just the opposite: the total number of "1" bits in a signal must be a positive number. If the modem is communicating with even parity, and the total number of 1 bits in the signal excluding the parity bit is odd, the parity bit will be 1, thus making the total number of "1" bits even. If the total number excluding the parity bit is even, the parity bit will be 0. Odd parity works similarly.

For conventional modems, the functionality of performing baud rate detection and synchronization, parity checking and length determination on each AT modem command was typically done in software. However, this approach can consume valuable processor resources that are needed to service the applications of the device in which the processor is running. A coprocessor could be added, but at the added expense of the coprocessor. Even in single-chip implementations, the coprocessor adds the cost of the additional chip area.

Figure 8:
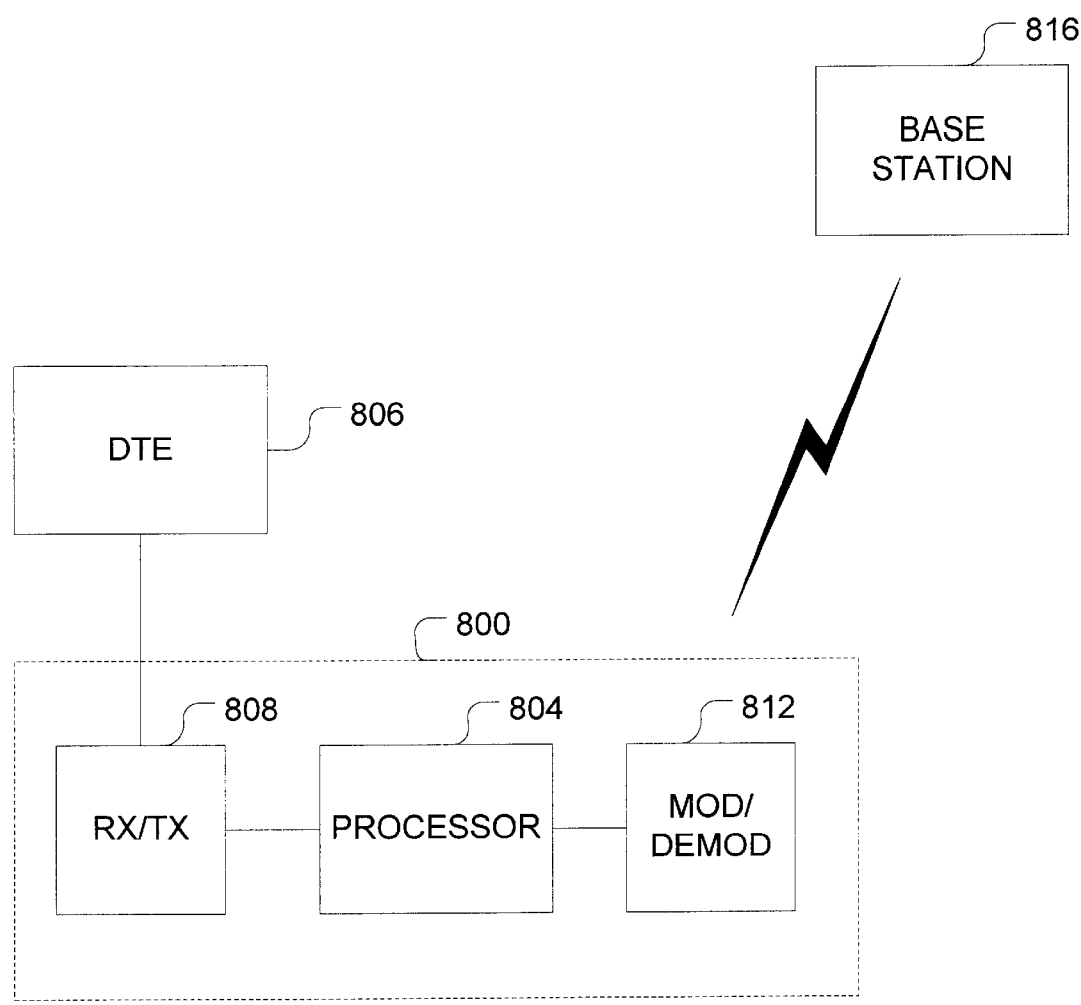
FIG. 8 is a block diagram illustrating an example environment in which the invention can be implemented according to one embodiment.

Before describing the invention in detail, it is useful to describe an example environment in which the invention can be implemented. Although the invention can be utilized in a number of applications, one example environment is that of a GSM system in which a GSM handset communicates with another GSM handset via the GSM network. FIG. 8 is a block diagram illustrating this example environment.

Referring now to FIG. 8, a GSM handset 800 in this example environment can include one or more processors 804 in communication with data terminal equipment (DTE) 806. A receiver/transmitter 808 is provided for facilitating communications between processor 804 and DTE 806. Receiver/transmitter 808 can be implemented as a USART or a UART or other receiver/transmitter device to provide a serial communication link between the DTE 806 and the processor 804. The link between processor 804 and DTE 806 can be implemented as an RS-232 serial communication link.

Also illustrated in FIG. 8 is a communication device such as a modulator/demodulator 812 associated with GSM handset 800. Modulator/demodulator 812 can, for example, be implemented as a conventional modem. However, alternative communication devices can be implemented to modulate data from processor 804 onto channel 822 and to demodulate data received from the channel 822.

In the described example environment, communication channel 822 can be the GSM network. However, in alternative environments, communication channel 822 can be, for example, a PSTN. Alternatively, in other environments communication channel 822 can be any other communication channel, either hard-wired or wireless, on which data can be modulated for communication between a processor-based system 800 and another entity 816.

Also illustrated in FIG. 8 is a GSM base station 816 with which processor-based system communicates. Base station 816 may also be a processor-based system with an architecture similar to that of GSM handset 800. Although only one base station 816 is illustrated, GSM handset 800 may actually communicate with a plurality of other handsets or base stations.

In operation, DTE 806 may wish to initiate a communication with GSM handset 800. To do so, DTE 806 sends a communication GSM handset 800 via receiver transmitter 808. For example, the communication from DTE 806 may be initiated using AT style modem commands. In this AT command example, DTE 806 transmits two AT command characters to GSM handset 800. These AT commands identify the parameters of the communication to take place. In order for the communication to be handled effectively, receiver/transmitter 808 is configured to handle the communication with the desired protocol identified by the command characters (e.g., correct parity, number of bits, and number of stop bits). The manner in which this is accomplished according to the invention is described below in terms of this example environment.

Although the invention is described in this document in terms of this example environment, after reading this description it will become apparent to one of ordinary skill in the art how the invention or features thereof can be implemented in alternative environments. For example, the processor-based system illustrated as a GSM handset 800 in this example environment can be any of a number of processor-based products or systems, including consumer-related products, as well as commercial or military products.

FIG. 1 is a block diagram illustrating an implementation of the invention according to one example embodiment. In the embodiment illustrated in FIG. 1, a receiver/transmitter 104 is provided to facilitate communications between a processor or processor-based system and another entity such as, for example data terminal equipment (DTE). For purposes of discussion, the receiver/transmitter 104 illustrated in FIG. 1 is a USART. However, after reading this description, it will become apparent to one of ordinary skill in the art bow receiver/transmitter 104 can be implemented using a UART or other receiver/transmitter device.

Also included in the embodiment illustrated in FIG. 1 is a precision time generator 112 configured to provide a timing signal to receiver/transmitter 104. According to the invention, a parameter detection module 108 is also provided. Parameter detection module 108 is provided to detect one or more parameters related to the communication link established or being established between the processor and another entity. In one embodiment, parameter detection module 108 is implemented on a single chip with receiver/transmitter 104, precision time generator 112 and the processor of the processor-based system.

In one embodiment, parameter detection module 108 receives the communication at an input port 122, and samples the communication to determine the communication parameters. As one example, parameter detection module 108 samples an AT header of a modem command to determine the communication parameters such as the parity, and the baud rate and the communication format.

Parameter detection module 108 provides an indication of these parameters to receiver transmitter 104 such that receiver transmitter 104 can be configured to handle the communication accordingly. This is illustrated by connection 124 between parameter detection module 108 and receiver/transmitter 104. More specifically, in one example embodiment of detecting modem AT commands, parameter detection module 108 can provide an indication of the parity, word length, number of stop bits, and an indication of enablement to receiver/transmitter 104.

Additionally, parameter detection module 108 can provide an indication to precision time generator 112 of the baud rate determined for the communication, as illustrated by flow line 126. In this embodiment, precision time generator 112 can use this baud rate determination to set its output clock OCLK rate to provide clock pulses at the appropriate frequency or frequencies to receiver/transmitter 104. The output clock OCLK tells receiver/transmitter 104 the appropriate time intervals at which to sample the received data, and the appropriate rate at which to clock out the transmitted data. In the embodiment illustrated in FIG. 1, precision time generator 112 and parameter detection module 108 operate off a standard reference clock CLK provided by the processor-based system. In single chip embodiments, clock CLK can be generated elsewhere on the chip. In the example embodiment illustrated in FIG. 1, clock CLK is a 3.9 MHz clock generated by a crystal oscillator.

Figure 2:
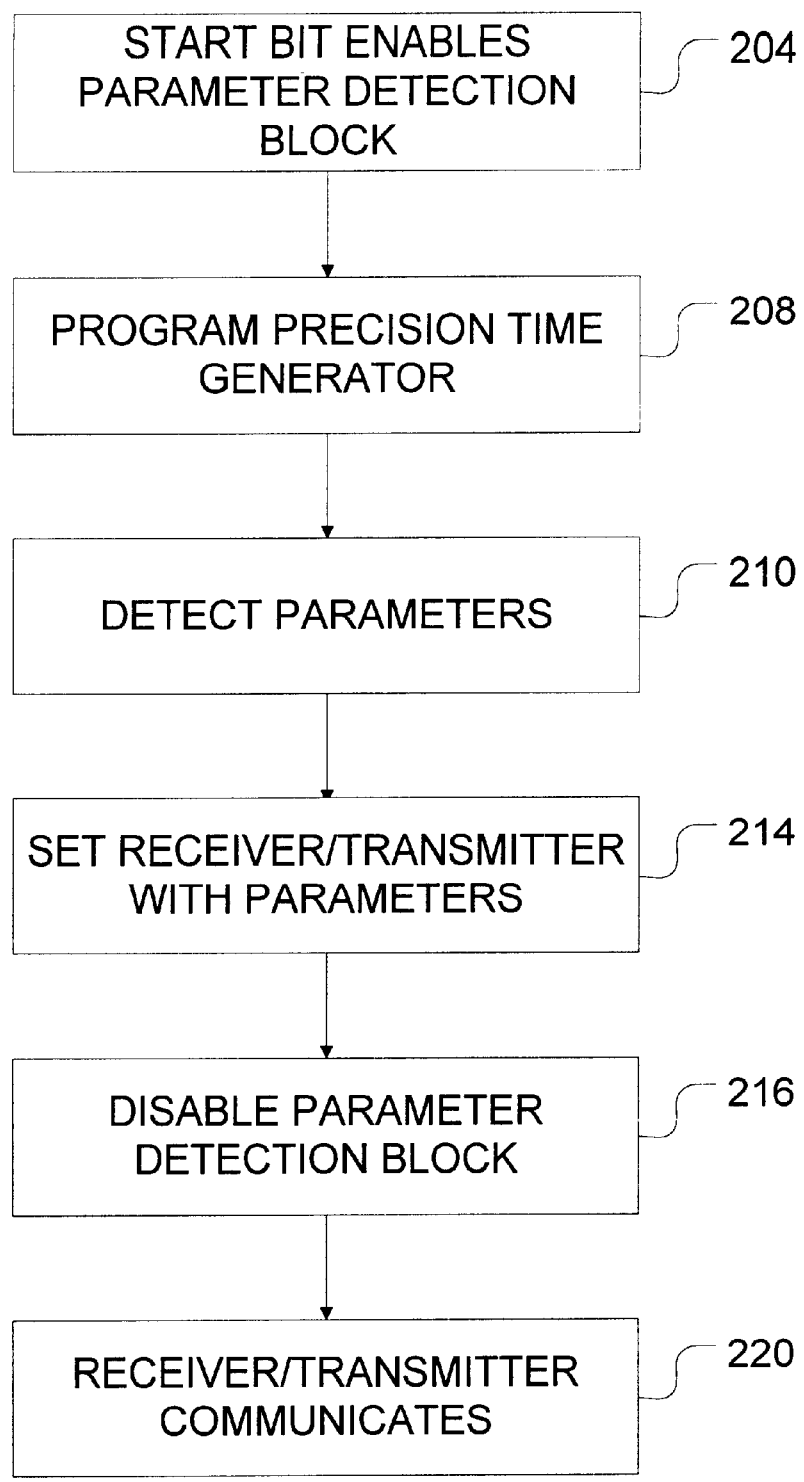
FIG. 2 is an operational flow diagram illustrating a process for detecting communication parameters according to one embodiment of the invention.

FIG. 2 is an operational flow diagram generally illustrating a process performed by parameter detection block 108 for setting up the receiver/transmitter 104 according to one embodiment of the invention. In some applications, the processor can set up a DMA channel to run from receiver/transmitter 104. The processor can also set up receiver/transmitter 104 and its associated timer to handle the communication with the external entity. However, because the processor does not necessarily know the baud rate, word length, parity, or other parameters, these pieces of information are not programmed by the processor but are, instead, determined by parameter detection module 108. It is parameter detection module 108, therefore, that provides this information to set up receiver/transmitter 104 for the communication.

Referring now to FIGS. 1 and 2, in a step 204, when a start bit is received, the start bit is used to enable, or activate, parameter detection module 108. Conventionally, a start bit, which can be signaled, for example, by the receive port 122 transitioning to a low state, would activate receiver/transmitter 104 to participate in the communication and receive the modem command and subsequent data.

However, in this embodiment, a low edge (receipt of start bit) at receive port 122 does not enable receiver/transmitter 104. Instead, the low edge at receive port 122 enables parameter detection module 108 to begin searching for a valid character or string of characters.

In a step 208, parameter detection module 108 programs precision time generator 112 with the appropriate data rate. Preferably, in the described embodiment, this data rate is expressed in terms of a baud rate.

In a step 210, parameter detection module 108 searches for a given character or set of characters, and uses the detected characters to determine one or more parameters of the communication link being established. In one embodiment, these parameters can include, for example, the baud rate, the length of the words, whether there is parity, whether the parity is odd or even, the number of stop bits, as well as other parameters associated with a communication link.

In a step 214, parameter detection module 108 programs receiver/transmitter 104 with the relevant parameters and enables the receiver portion of receiver/transmitter to receive characters from the communication port. In embodiments using AT modem commands, the receiver/transmitter 104 provides characters to memory from the first character after the second AT character (i.e., 't', 'T' or '/') is received.

In a step 216, parameter detection module 108 disables itself and optionally sets an interrupt to the processor to signal that bytes or other units of data are being received by receiver/transmitter 104.

In one embodiment, the values of the characters decoded are also made available in a register accessible by the processor so that the processor can check exactly which characters were decoded. Specifically, in some embodiments using AT modem commands, it is desired that the processor can detect whether a 't', 'T' or a '/' was received as the second command character.

In a step 220, receiver/transmitter 104 continues to receive data at the designated rate, and also in preferred embodiments transmits data at the same rate. It is noted that there may be implementations where it is desirable that the transmit and receive rates be different from one another.

Receiver transmitter 104 may ultimately be disabled again by the processor. In one embodiment, being disabled implies that the clock is removed from that block as well as logically putting the block in the safe state. This is done to minimize power consumption.

In one embodiment, it is assumed that there should be a suitable delay before the start bit of the AT command to allow parameter detection module 108 to finish processing any earlier false triggers and reset to its waiting mode. Therefore, if there is a random data stream without gaps between characters, parameter detection module 108 is not expected to detect an AT command in the middle of this stream in this embodiment.

As stated above, in one embodiment the rate detected is in terms of a baud rate. In this embodiment, it is preferable that parameter detection module 108 be configured to detect standard asynchronous data formats at predetermined baud rates. In one embodiment, parameter detection module 108 is programmed to detect eight standard baud rates from 2,400 baud to 230,400 baud. In one embodiment, the baud rate determination can be made by counting the number of transitions of a reference signal within a given bit time. Specifically, in one embodiment the reference signal used is the system clock provided by the processor-based system. Table 1 is a table illustrating the bit times for given baud rates and the number of counts per bit for a given baud rate, assuming a 3.9 MHz clock is used for counting the period of one symbol.

TABLE 1

| Baud Rate/Kbps | Bit Time/µs | Counts/Bit |
| --- | --- | --- |
| 230.4 | 4.3 | 16 |
| 115.2 | 8.7 | 33 |
| 57.6 | 17.4 | 67 |
| 38.4 | 26.0 | 101 |
| 19.2 | 52.1 | 203 |
| 9.6 | 104.2 | 406 |
| 4.8 | 208.3 | 812 |
| 2.4 | 416.7 | 1625 |

From Table 1, it can be seen that to implement this particular embodiment, an 11-bit counter should be sufficient to count up to the maximum number of counts per bit. ($2^{11}$=2,048.)

As stated above, parameter detection module 108 can also examine the received characters to determine whether an acceptable character string is received. In one embodiment, parameter detection module 108 looks for an appropriate character string associated with modem AT commands. In one implementation of this embodiment, parameter detection module 108 responds to a specific set of character pairs as acceptable. These pairs are listed in Table 2. Also listed in Table 2 are the corresponding ASCII hex codes, and the associated binary codes.

TABLE 2

| Character Pair | ASCII Hex Codes | Binary Code |
| --- | --- | --- |
| At | 0x61, 0x74 | 01100001, 01110100 |
| AT | 0x41, 0x54 | 01000001, 01010100 |
| a/ | 0x61, 0x2F | 01100001, 00101111 |
| A/ | 0x41, 0x2F | 01000001, 00101111 |

In one embodiment, parameter detection module 108 also allows two (or more) successive 'a' characters to be sent, i.e. 'aat', 'aAT', 'Aat', 'AAT', 'aa/', 'aA/', 'Aa/', 'AA/' are also possible sequences. In this case the first 'a' or 'A' can be discarded and only the last two characters used in the word/parity length calculations.

The commands in one embodiment are received such that parameter detection module 108 receives the least significant bit of the first byte first. As can be seen with reference to Table 2, this byte is always a 1 in binary representation. Receipt of a 1 in this embodiment enables parameter detection module 108 to measure the width of the start bit to thereby determine the baud rate, as briefly described above. Preferably, subsequent bits in the data stream are sampled at the middle of the bit period, as determined by the detected baud rate.

In one embodiment, all of the least significant seven bits of the first byte are compared with possible valid characters. The eighth bit could be a data bit or a parity bit. Therefore, in one embodiment the eighth bit is saved from the first character and used after detection of the second carrier to determine whether the combination is a valid pair of characters. In one embodiment, if the second character is detected to be an 'a' or an 'A' (i.e., either one being a valid first character where AT commands are used), then the data for the second character is copied into the first character location, and the next character is taken as a valid second character. In one embodiment, the character pairs 'aT' and 'At' are not recognized, as these are invalid pairings.

As described above, in one embodiment, the eighth bit of the first byte can be either a data bit or a parity bit. This is because, in this embodiment, four combinations of length and parity can be detected:

Seven bit data, no parity, two stop bits;
Seven bit data, even parity, one stop bit;
Seven bit data, odd parity, one stop bit;
Eight bit data, no parity, one stop bit.

As can be seen, these combinations provide 10-bit words, including the start bit and the stop bit. Seven bit data, mark parity, one stop bit, and seven bit data, space parity, one stop bit will not be detected in one embodiment. In this embodiment, these alias to seven bit data with no parity, two stop bits, and eight bit data with no parity and one stop bit, respectively.

As stated above, in one embodiment, detection of the data rate is determined by counting the number of transitions of a referenced timing signal that occur within a given bit time. In embodiments using AT commands, when the line is idle, the receive line is constantly in a high state, parameter detection module 108 recognizes this as the idle condition and does nothing. It waits for a high to low transition on the receive line to indicate the receipt of a start bit.

Figure 3:
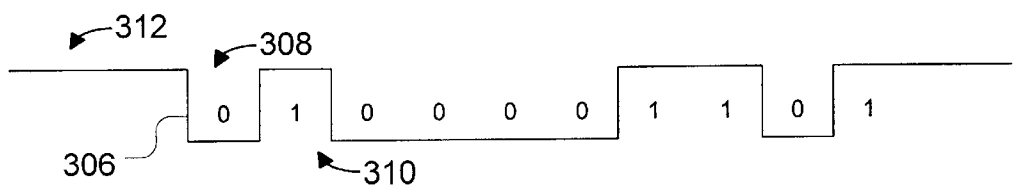
FIG. 3 is a diagram illustrating a bit sequence for an example valid character that can be received at the initiation of the communication.

FIG. 3 is a diagram illustrating an example sequence that can be received. Referring now to FIG. 3, the sequence begins in the idle state 312 where, in this embodiment, the receive line is constantly high. Start bit 308 is a low bit, the beginning of which is indicated by falling edge 306. Because, in a valid AT command, the first character is either an 'a' or an 'A' the least significant bit of this character is always a 1. Therefore, in this embodiment, the next bit received in a valid sequence should be a 1. This is illustrated by bit 310. Thus, in a valid sequence in this embodiment, there is always a falling edge 306 indicating a start bit 308, which is followed by a 1, which is the first bit of the first character in a valid sequence.

Figure 4:
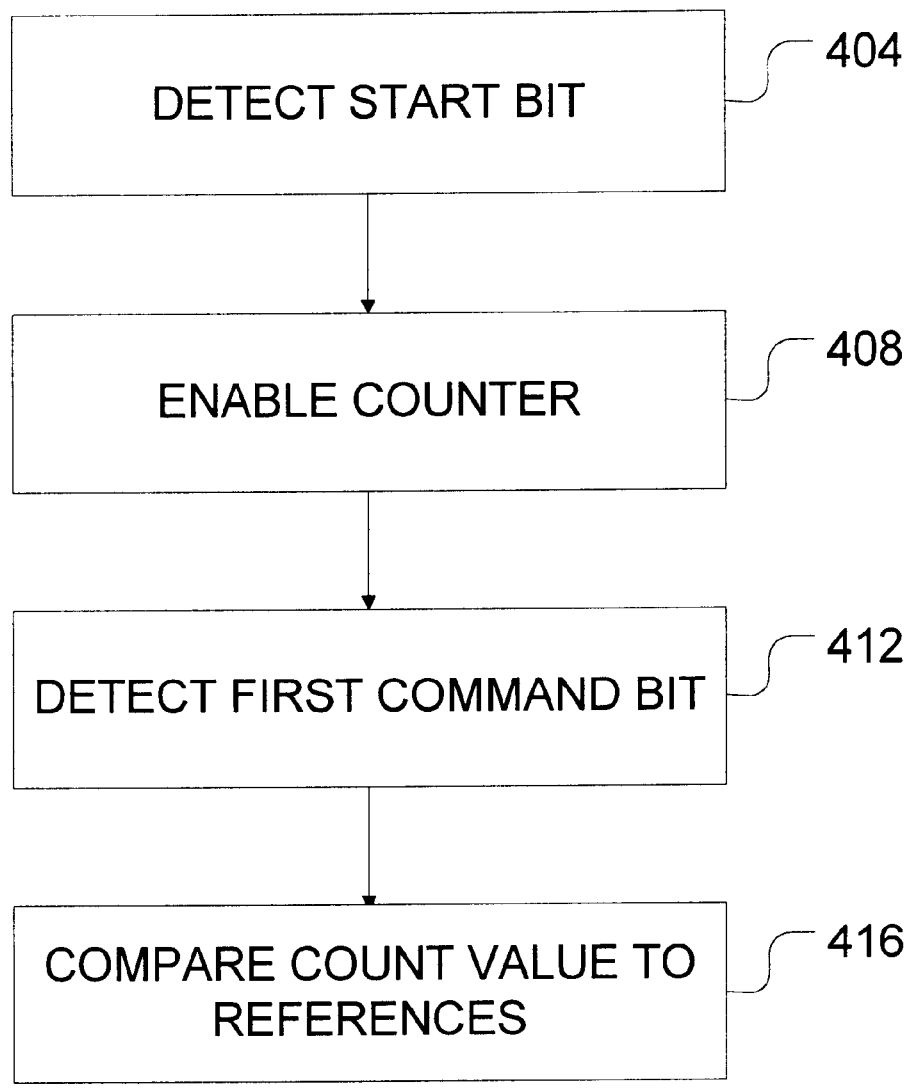
FIG. 4 is an operational flow diagram illustrating the determination of the valid data rate according to one embodiment of the invention.

FIG. 4 is an operational flow diagram illustrating a process for determining the baud rate upon receipt of a valid sequence, according to one embodiment of the invention. In a step 404, parameter detection module 108 detects the receipt of start bit 308. As stated, in one embodiment, the line is constantly high in the idle state and transitions to a zero when the start bit is received. Thus, in this embodiment, falling edge 306 is used to detect the beginning of start bit 308. Thus, at the occurrence of falling edge 306, a counter is enabled to begin counting clock pulses of a reference clock signal. This occurs in a step 408. Preferably, the counter is implemented to count falling edges of the reference clock signal, although other counting techniques can be utilized. The counter continues counting transitions until, in a step 412, the receive port transitions to a high, indicating either an 'a' or an 'A' has been received. At this point, the number of clock transitions that occur within the bit time of the start bit has been counted.

In a step 416, this count is compared to expected counts for each of the specified baud rates. As discussed above with reference to Table 1, the maximum number of expected counts per bit are provided in the third column. In one embodiment, the comparison of the number of counts with the expected counts can be made by a table lookup in parameter detection module 108. Parameter detection module 108 can further look up a value to load to precision time generator 112 to program the precision time generator. In one embodiment, this table can be software programmable to accommodate changes in desired baud rates to be detected, or other parameters. In one embodiment, decision values are used as opposed to the expected number of counts per bit. Decision values can be set midway between the different baud rates. Table 3 is a table illustrating the decision values and values to load to precision time generator 112 in response to the number of transitions counted during the start bit.

TABLE 3

| Baud Rate/kbps | Expected Counts/Bit | Data Value For Decision | Ideal Value to Load to PTG | Real Value to Load to PTG |
|---|---|---|---|---|
| 230.4 | 16 | 24 | 61946 | 62875 |
| 115.2 | 33 | 50 | 30973 | 31128 |
| 57.6 | 67 | 84 | 15486 | 15486 |
| 38.4 | 101 | 152 | 10324 | 10324 |
| 19.2 | 203 | 304 | 5162 | 5162 |
| 9.6 | 406 | 609 | 2581 | 2581 |
| 4.8 | 812 | 1218 | 1290 | 1290 |
| 2.4 | 1625 | 2047 | 645 | 645 |

Because the maximum error in baud rate is expected to be only approximately 2.5%, the chance of erroneously detecting a valid baud rate is expected to be very small. If, for some reason, a detected baud rate is invalid, in one embodiment the character does not match in the subsequent sampling, and the detection process fails. In one embodiment, if less than eight values are used, then the last valid decision value (and all subsequent decision values) are set to zero. This means that the last valid baud rate will be selected or no baud rate will be selected.

Also, in one embodiment, a minimum pulse width is to be half the smallest decision value, which is actually ⅔ of the smallest expected value. Other options can be selected as well. For example, if a pulse of less than this minimum pulse width (half the smallest decision value) is detected then this can be rejected as a glitch and the detection operation is said to have failed. Also, if a pulse of more than or equal to the minimum pulse width and less than or equal to the $1^{st}$ decision value is detected, then the 1st row of the table is selected. If a pulse of more than the Nth decision value and less than or equal to the (N+1)th decision value is detected, then the (N+1)th row of the table is selected, for N=1 to 7. Additionally, if a pulse of more than the 8th decision value is detected (equivalent to an overflow of the 11 bit counter), then the baud rate is invalid and the parameter detection fails.

In a preferred embodiment, the table is preferably searched in order from row 1 to row 8 to ensure that faster baud rates are detected more quickly. Alternatively, the search could be performed in parallel to the count mechanism, such that when the first rising edge is detected, the selected row of the table is known at that time. If the detection has not failed, then a decision has already been made as to the baud rate. Preferably, the value to be loaded into the precision timing generator 112 to create a 16x-baud-rate clock for receiver/transmitter 104 is given by the final column of Table 3. Preferably, this is slightly offset from the ideal value to compensate for timing offsets inherent in parameter detection module 108. These offsets can be significant at higher baud rates, but can be ignored as the baud rate decreases. These values provided are in terms of an example embodiment only, and may need to be adjusted for particular implementations.

In order to detect the commands received, parameter detection module 108 begins sampling the received data stream at the midpoint of the second, third, fourth, fifth, sixth, seventh, eighth, ninth, and tenth bits. In one embodiment, the sample clock is derived from the precision timing generator 112. A half-baud sample can be created by counting eight clocks from precision timing generator 112, followed by successive 16-clock periods to sample the subsequent bits. This saves silicon area by reusing the same counter for parameter detection module 108 as for receiver/transmitter 104.

Figure 5:
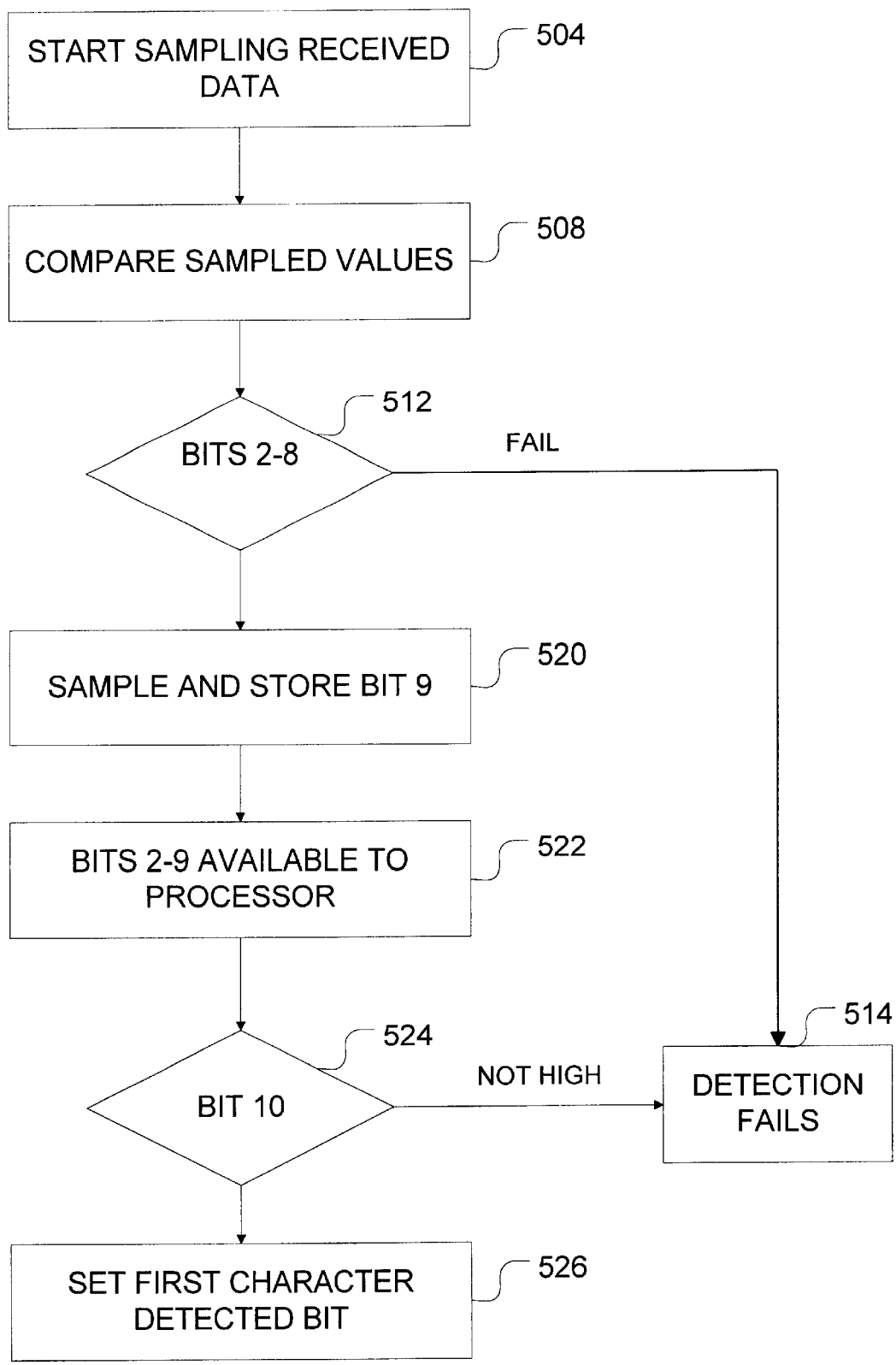
FIG. 5 is an operational flow diagram illustrating a process for detecting a first character according to one embodiment of the invention.

One example process for matching the received characters is illustrated in FIG. 5, according to one embodiment of the invention. In a step 504, parameter detection module 108 begins sampling the received data. In a step 508, parameter detection module 108 compares the sample values with a character loaded in a first character compare register. In one embodiment, the characters loaded into the first character compare registers are hard-coded to be 'a' and 'A', and are not programmable. In alternative embodiments, these characters can be programmable to enable the detection of other characters to accommodate alternative communication formats. However, as discussed above, the only characters accepted as the first character in a preferred embodiment using AT modem commands are either an 'a' or an 'A'. Because the format can be seven or eight bits with even parity, odd parity, or no parity, and one or two stop bits, there are eight scenarios for possible first characters in one embodiment. Table 4 is a table outlining the eight possible first characters in this embodiment.

TABLE 4

| Bit# | 1 | 2 | 3 | 4 | 5 | 6 | 7 | 8 | 9 | 10 |
|---|---|---|---|---|---|---|---|---|---|---|
| a7N2 | 0 | 1 | 0 | 0 | 0 | 0 | 1 | 1 | 1 | 1 |
| a7E1 | 0 | 1 | 0 | 0 | 0 | 0 | 1 | 1 | 1 | 1 |
| a7O1 | 0 | 1 | 0 | 0 | 0 | 0 | 1 | 1 | 0 | 1 |
| a8N1 | 0 | 1 | 0 | 0 | 0 | 0 | 1 | 1 | 0 | 1 |
| A7N2 | 0 | 1 | 0 | 0 | 0 | 0 | 0 | 1 | 1 | 1 |
| A7E1 | 0 | 1 | 0 | 0 | 0 | 0 | 0 | 1 | 0 | 1 |
| A7O1 | 0 | 1 | 0 | 0 | 0 | 0 | 0 | 1 | 1 | 1 |
| A8N1 | 0 | 1 | 0 | 0 | 0 | 0 | 0 | 1 | 0 | 1 |

In a step 512, if the comparison fails on any of bits 2 through 8, then the procedure fails, as illustrated by step 514. Because bit 7 can be either a 1 or a 0, this can be represented by giving two complete 8 bit registers to hold the 'a' and the 'A', or by providing a mask register to select bit 7 as not to be considered. In other words, in this alternative, the comparison does not care whether bit 7 is a 0 or a 1. Note that in this embodiment, it is not necessary to test bit 1, as bit 1 is always a 0. In fact, in this embodiment, if bit 1 is not a 0, the line remains idle and the process does not even begin. However, there may be alternative embodiments in which bit 1 is tested as well.

In a step 520, bit 9 is sampled and stored as bit 9 of the first character. As stated above, in one embodiment this bit 9 can be used with the second character to determine both word length and parity.

In a step 522, bits 2 through 9 are made available to the processor in a register accessible by the processor. For convenience, this register is referred to as a "first character register" in this document. The processor can retrieve these bits from the first character register if desired to determine the contents thereof.

In a step 524, bit 10 is also tested. If bit 10 is not high, the detection fails in step 514. Finally, in a step 526, the first character detected bit is set in a status register if the detection process has not failed as of this point.

Figure 6:
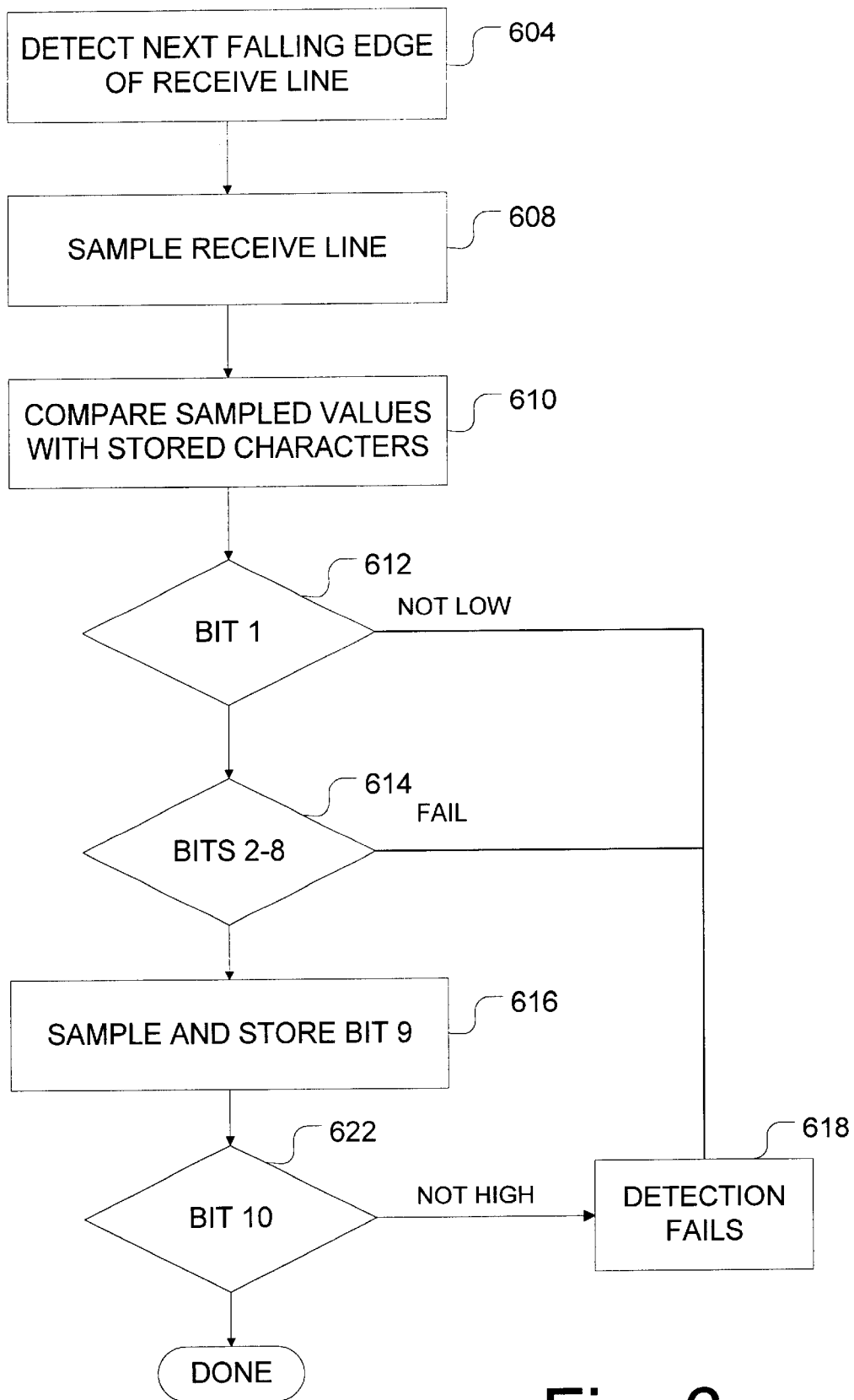
FIG. 6 is an operational flow diagram illustrating a process for detecting a second character according to one embodiment of the invention.

If the detection process has not failed, the process continues with second character matching. FIG. 6 is an operational flow diagram illustrating a process for performing second character matching according to one embodiment of the invention. If the first character has passed all tests, for example, as set forth above with reference to FIG. 5, then parameter detection module 108 receives the second character. In a step 604, parameter detection module 108 waits for the next falling edge of the received line. In one embodiment, the next falling edge indicates the start character 2. Because, the 'a' or 'A' ends with a 1 in bit 10, and because the 'a', 'A', 't', 'T' and '/' all begin with a 0 in bit 1, a next falling edge must necessarily occur at the beginning of the second character when a second character is received in this embodiment. Because in embodiments using AT commands, timing between the first and second characters is not fixed, the occurrence of the next falling edge can be at any arbitrary time later. Receiver/transmitter 104 may be sampled by the 16x-baud-rate clock being generated by precision timing generator 112.

In a step 608, when the anticipated falling edge is detected, the receive line is sampled by parameter detection module 108 at the middle of bits one through ten. This is slightly different from the first character, where, in one embodiment, bit 1 (i.e., the start bit) was not sampled but was instead used as a metric for determining the baud rate.

Additionally, when a valid start bit is detected for the second character, another register readable by the processor is cleared, and made ready to store the second character. This register is referred to as a "second character register."

In a step 610, parameter detection module 108 compares the sampled values with characters loaded into a second character compare register or table, as well as characters loaded in the first character compare register or table. Because there are five possible second characters ('a', 'A', 't', 'T', and '/') it is not necessary to have a mask register in embodiments using AT commands. In fact, in these embodiments, the inclusion of a mask register would inhibit the differentiation among the five possible valid characters in the command set. Table 5 is a table illustrating the 12 possible bit patterns of the possible valid second characters. These bit patterns correspond to each of the characters 't', 'T', and '/', with the various combinations of seven or eight bits, even, odd, or no parity, and one or two stop bits.

TABLE 5

| Bit | 1 | 2 | 3 | 4 | 5 | 6 | 7 | 8 | 9 | 10 |
|---|---|---|---|---|---|---|---|---|---|---|
| T7N2 | 0 | 0 | 0 | 1 | 0 | 1 | 1 | 1 | 1 | 1 |
| T7E1 | 0 | 0 | 0 | 1 | 0 | 1 | 1 | 1 | 0 | 1 |
| T7O1 | 0 | 0 | 0 | 1 | 0 | 1 | 1 | 1 | 1 | 1 |
| T8N1 | 0 | 0 | 0 | 1 | 0 | 1 | 1 | 1 | 0 | 1 |
| t7N2 | 0 | 0 | 0 | 1 | 0 | 1 | 0 | 1 | 1 | 1 |
| t7E1 | 0 | 0 | 0 | 1 | 0 | 1 | 0 | 1 | 1 | 1 |
| t7O1 | 0 | 0 | 0 | 1 | 0 | 1 | 0 | 1 | 0 | 1 |
| t8N1 | 0 | 0 | 0 | 1 | 0 | 1 | 0 | 1 | 0 | 1 |
| /7N2 | 0 | 1 | 1 | 1 | 1 | 0 | 1 | 0 | 1 | 1 |
| /7E1 | 0 | 1 | 1 | 1 | 1 | 0 | 1 | 0 | 1 | 1 |
| /7O1 | 0 | 1 | 1 | 1 | 1 | 0 | 1 | 0 | 0 | 1 |
| /8N1 | 0 | 1 | 1 | 1 | 1 | 0 | 1 | 0 | 0 | 1 |

In a step 612, the first bit is compared to the first character in the character compare registers (which can include the bits of Tables 4 and 5). Because, for each of the possible characters bit 1 should always be 0, if bit 1 is not low, then the detection fails as illustrated by a step 618.

If, on the other hand, bit 1 is low, the detection continues at step 614, in which bits 2 through 8 are compared. If any of bits 2 through 8 fails the comparison with the possible patterns in the compare registers, the detection also fails as illustrated by step 618. If, however, the bits 2 through 8 match one of the possible patterns in the compare registers, bit 9 is sampled and stored as second character bit 9 in step 616. This bit is used with first character bit 9 to determine both word length and parity.

The comparison continues with bit 10 in a step 622. Because bit 10 must always be high, if the detection determines that bit 10 is not high, the detection fails in a step 618.

As stated above, in embodiments using AT commands, it is conceivable that the second character can be detected as either an 'a', 'A', 't', 'T' or '/'. If the second character is also detected to be an 'a' or an 'A', the second character is made into the first character, and the original 'a' or 'A' is ignored. In one embodiment, this is accomplished simply by transferring bits 2 through 9 of the second character register into bits 2 through 9 of the first character register. Bit 9 is also transferred into first character bit 9. Parameter detection module 108 now returns to wait for a "true" second character start bit.

If the second character is detected to be a 't', 'T' or '/', then bits 2 through 9 are made available to the processor in a second character register. As stated above, bit 9 was sampled and stored as second character bit 9. This bit is used with the first character to determine word length and parity. The second character detected bit will be set in the status register after a valid 't', 'T' or '/' has been detected. In one embodiment, the combinations 'aT' and 'At' are invalid and cause parameter detection module 108 to indicate a failure in one embodiment.

The possible combinations of character, word length, and parity in one embodiment are illustrated in Table 6.

TABLE 6

| Actual Format | First Char Bit 7 | First Char Bit 9 | Second Char Bit 7 | Second Char Bit 9 |
|---|---|---|---|---|
| at7N2 | 1 | 1 | 1 | 1 |
| at7E1 | 1 | 1 | 1 | 0 |
| at7O1 | 1 | 0 | 1 | 1 |
| at8N1 | 1 | 0 | 1 | 0 |
| AT7N2 | 0 | 1 | 0 | 1 |
| AT7E1 | 0 | 0 | 0 | 1 |
| AT7O1 | 0 | 1 | 0 | 0 |
| AT8N1 | 0 | 0 | 0 | 0 |
| a/7N2 | 1 | 1 | 1 | 1 |
| a/7E1 | 1 | 1 | 1 | 1 |
| a/7O1 | 1 | 0 | 1 | 0 |
| a/8N1 | 1 | 0 | 1 | 0 |
| A/7N2 | 0 | 1 | 1 | 1 |
| A/7E1 | 0 | 0 | 1 | 1 |
| A/7O1 | 0 | 1 | 1 | 0 |
| A/8N1 | 0 | 0 | 1 | 0 |

Reviewing Table 6, it can be seen that, where the '/' is second, it is not possible to detect the word length or parity. This could lead to problems with parameter detection module 108 determining a word length and parity to provide to receiver/transmitter 104. However, the 'a/' or 'A/' command is interpreted to mean "repeat previous AT command." Therefore, if this occurs, there must have been a previous command to which this present command refers. Therefore, if the 'a/' or 'A/' character sequence is detected, the word length and parity is assumed to be the same as the previous valid detection in one embodiment of the invention. To accomplish this, in one embodiment, the values for the word length and parity are preserved from the previous correct detection until the next correct detection is made. If the 'a/' or 'A/' sequence is detected, then parameter detection module 108 defines the word length and parity as the succeeding values for word length and parity and, therefore, the values for word length and parity do not need to be recalculated.

In one embodiment, a word/parity reset bit in the control register allows software to reset this portion of the circuit. Once the word/parity reset bit is reset, this indicates that no correct detections have been made previously. When parameter detection module successfully detects an 'AT' or 'at' command with valid word length and parity, it sets this reset bit. If an 'A/' or an 'a/' is detected and the word parity bit is reset, there has been no previous correct detection, and parameter detection module 108 cannot make a detection. As such, in this scenario, a failure is indicated. As stated, the a software can reset this bit at any time, and usually does this when the parameter detection module is disabled to avoid race conditions.

If the second character detected is not a '/', then, from Table 6, it can be seen that the following rules provide the parity and word length:
1B7=First Char Bit 7, 1B9=First Char Bit 9, 2B7=Second Char Bit 7, 2B9=Second Char Bit 9.

$$7N2 = 1B7.1B9.2B7.2B9 + \overline{1B7}.1B9.\overline{2B7}.2B9$$
$$7E1 = 1B7.1B9.2B7.\overline{2B9} + \overline{1B7}.1B9.2B7.2B9$$
$$7O1 = 1B7.\overline{1B9}.2B7.2B9 + \overline{1B7}.1B9.\overline{2B7}.\overline{2B9}$$
$$8N1 = 1B7.\overline{1B9}.2B7.\overline{2B9} + \overline{1B7}.1B9.2B7.\overline{2B9}$$

In one embodiment, any other combination results in an indication that the detection has failed.

Once parameter detection module 108 has performed its functions as described above, it has determined the baud rate, word length, and parity of the data that is being received. Parameter detection module 108 provides these parameters to receiver/transmitter 104, such that it is enabled with the correct parity, word length, and other parameters necessary to receive the data.

In one embodiment, a loopback disable bit is provided in a control register within parameter detection module 108. If the loopback disabled bit in the control register is enabled, then parameter detection module 108 disables the hardware loopback in the receiver/transmitter 104 when a valid detection is made. If, on the other hand, the loopback disabled bit is cleared, then parameter detection module 108 does not attempt to change the state of the hardware loopback in receiver/transmitter 104. In one embodiment, when this occurs, parameter detection module 108 sends an interrupt to the processor, sets the correct detection bit in the status register, and shuts itself off. In one embodiment, this includes disabling its own clock. The parameter detection circuit 108 can remain disabled until enabled by the processor.

In one embodiment, when parameter detection module 108 is programming receiver/transmitter 104 or programmable timing generator 112, the processor is disabled from accessing these blocks. At this time, the processor may also be denied access to the lookup table of baud rate data. However, in one embodiment, it is preferred that the processor be able to write or read data from all other registers at all times. Once the parameter detection module 108 is enabled, it is preferred that the processor not write to any registers until the block is disabled again (either by completing a correct detection and disabling itself, or being disabled by the processor). However, the processor will need to read values from these registers.

As stated above, there are several conditions which may cause parameter detection module 108 to fail in its detection. These reasons are repeated below:

Start Bit is too short (less than half the smallest Decision Value).

The baud counter overflows, indicating more than 2047 counts in the first bit period.

Bit 2 through Bit 8 of the first character do not match either of the two First Character Compare registers.

Bit 10 of the first character is not a 1.

Bit 1 of the second character is not a 0.

Bit 2 through Bit 8 of the second character does not match any of the three Second Character Compare registers or either of the two First Character Compare registers.

Bit 10 of the second character is not a 1.

'a' is followed by 'T' or 'A' is followed by 't'.

An 'a/' or 'A/' sequence is detected and the Word/Parity Reset is 0.

If parameter detection module 108 fails, parameter detection module 108 resets itself and waits for the next start bit (high-to-low transition on the receive line). In one embodiment, the clocks are disabled to parameter detection module 108 when it is idle. Preferably, parameter detection module 108 simply resets itself and does not disable itself as the result of a failure.

A status register can be included in parameter detection module 108 and can provide a bit representing each of the failure cases. When a detection fails, the appropriate bit can be set and an interrupt sent to the processor. The generation of this interrupt on failure can normally be disabled in the control register by setting the failure interrupt bit to 0, but preferably can be enabled by setting this bit to 1, which allows testing and debugging, if desired.

One or more registers can be provided with parameter detection module 108 to facilitate parameter detection and sharing of information among various other system components including the processor. One such register is a control register. The bits of the control register in one embodiment are now described.

Bit 0 is the Parameter Detection Enable bit. At reset this shall be 0, indicating the parameter detection module is disabled. This may be set to 1 at any time by the processor which will enable the parameter detection module. The block will then wait for a high-to-low transition on the receive line and then start the comparison. If the comparison succeeds an interrupt will be sent to the processor, the Correct Detection bit will be set in the Status Register and the parameter detection module will disable itself by clearing this bit. In one embodiment, the cleared bit is set to 0.

Bit 1 is the Failure Interrupt bit. At reset this shall be 0, indicating that parameter detection module 108 will only create an interrupt to the processor when a successful detection has occurred. The processor can set this bit to 1 to indicate that the processor will be interrupted whenever a failure occurs as well as when a successful detection occurs.

Bit 2 is the Word/Parity Reset bit. At reset this shall be 0, indicating that a correct detection has not occurred yet. This bit will be set to 1 by the parameter detection module 108 whenever a correct detection takes place. In one embodiment, it can only be cleared by the processor. This bit is used by the parameter detection when a 'a/' or a 'A/' is detected. If this bit is 1 then the previously stored values of word length and parity will be used and the parameter detection will succeed. On the other hand, if this bit is 0 then the parameter detection will fail.

Bit 3 is the Source Select bit. At reset this shall be 0, indicating that the parameter detection circuit will be sensing the input 122. The processor can set this bit to 1 to switch the parameter detection circuit to sense a receiver/transmitter 104 transmit line. This will enable parameter detection testing to be run easily by sending test patterns out of the receiver/transmitter 104.

Bit 4 is the Loopback Disable bit. At reset this shall be 0, indicating that the parameter detection circuit will not attempt to disable the hardware loopback in the receiver/transmitter 104 upon correct detection of an AT sequence. The processor may set this bit to 1 to make the parameter detection module disable the hardware loopback in the receiver/transmitter 104 upon correct detection of an AT sequence.

In this embodiment, there are a total of 16 bits available, and Bit 5 through Bit 15 are reserved for future uses.

Also provided in one embodiment is a status parameter detection register. In one embodiment, this register is read only and has 16 bits. These bits are now described.

Bit 0 is the First Character Detected bit. This bit will be cleared to 0 when a high-to-low transition is detected at the start of the first character and will be set to 1 when the first character has been fully loaded and compared successfully with the stored characters. Bit 1 is the Second Character Detected bit. This bit will be cleared to 0 when a high-to-low transition is detected at the start of the first character and will be set to 1 when the second character has been fully loaded and compared successfully with the stored characters.

Bit 2 is the Word Length bit. This bit will be set to 0 when the word length is detected successfully as 7bits, and will be set to 1 when the word length is detected successfully as 8bits. At reset this bit is set to 0, but will not be altered by any other actions of the parameter detection circuit.

Bits [4:3] are the Parity bits. This bit pair will be set to 00 when the parity is detected as being No Parity, and to 01 when parity is detected as being Even Parity, to 10 when parity is detected as being Odd Parity. In the described example embodiment, 11 is not a valid combination.

Bit 5 is the Correct Detection bit. This will be cleared to 0 when a high-to-low transition is detected at the start of the first character and will be set to 1 when the parameter detection completes successfully, indicating that the baud rate has been detected, the character comparisons succeeded, word length and parity have been decoded correctly, precision time generator 112 and receiver/transmitter 104 have been set up and activated and the parameter detection module 108 is about to disable itself. This will also cause an interrupt to the processor. Once an interrupt has been generated due to correct detection it will be cleared by reading this register, or by a new start bit being detected.

Bit 6 is the Active bit. When the parameter detection has detected the high-to-low transition and is in the process of trying to detect a character sequence this bit will be 1. Otherwise this bit remains at 0. Bit 7 through bit 15 are reserved.

Another register provided is a status failure register. Status failure register is also a 16 bit register. Bits 0 through 8 are cleared to 0 by the high-to-low transition detected at the start of the first character and will be set to 1 when the specified failure mode occurs. Any of these bits being set will cause the parameter detection to fail and the block will go into idle again. An interrupt will be sent to the processor if the Failure Interrupt bit is set in the control register. Once an interrupt has been generated due to a failure it will be cleared by reading this register, or by a new start bit being detected.

Bit 0 indicates that the Start Bit was too short to make a valid baud rate detection. Bit 1 indicates a Baud Counter Overflow; Bit 2 indicates First Character Match Error; Bit 3 indicates First Character Stop Bit Error; Bit 4 indicates Second Character Start Bit Error; Bit 5 indicates Second Character Match Error; Bit 6 indicates Second Character Stop Bit Error; Bit 7 indicates an 'At' or 'aT' was received; and Bit 8 indicates No Previous Word/Parity. In this embodiment, bits 9 through 15 are reserved.

As stated above, detected characters are placed in first and second character registers so that they can be accessed by the processor. In these registers, Bit 0 through Bit 7 hold the First Character of the last detection attempt, with the least significant bit being in Bit 0. Therefore Bit 0 of this register corresponds to Bit 2 of the word. These bits can be cleared to 0 when a valid start bit and baud rate is detected and can be loaded with the full character when a valid first character is detected. Bits 8 through 15 of this register can hold the Second Character of the last detection attempt, with the least significant bit being in Bit 8. Therefore Bit 8 of this register corresponds to Bit 2 of the word. These bits can be cleared to 0 when a valid start bit is detected in the second character and will be loaded with the full character when a valid second character is detected.

A baud count register can be provided to hold the value of the counter used to measure the data rate.

A temporary character register can be provided. While the parameter detection module is processing the incoming character it loads the bits into this register. If a detection failure occurs then the actual bits read can be seen in this register.

A baud table register is also provided in one embodiment. This register can be made up of 8 pairs of registers, DecisionValue0 through DecisionValue7 paired with TimerValue0 through TimerValue7. These will be arranged in the memory map as eight DecisionValue registers followed by eight TimerValue registers.

Bits [10:0] of the DecisionValue register hold the value used to compare with the Baud Count value to decide which baud rate is to be selected. Bit 11 through bit 15 are reserved.

Bits [15:0] hold the value that will be loaded into PTGB when the given baud rate is selected.

Parameter detection module 108 can be implemented in a variety of configurations to carry out the functionality and implement the features described above. Additionally, parameter detection module 108 can be implemented using hardware, software, firmware, or any combination of the above. Although not limited to any particular configuration or implementation, one example implementation of parameter detection module 108 is now described with reference to FIG. 7.

Figure 7:
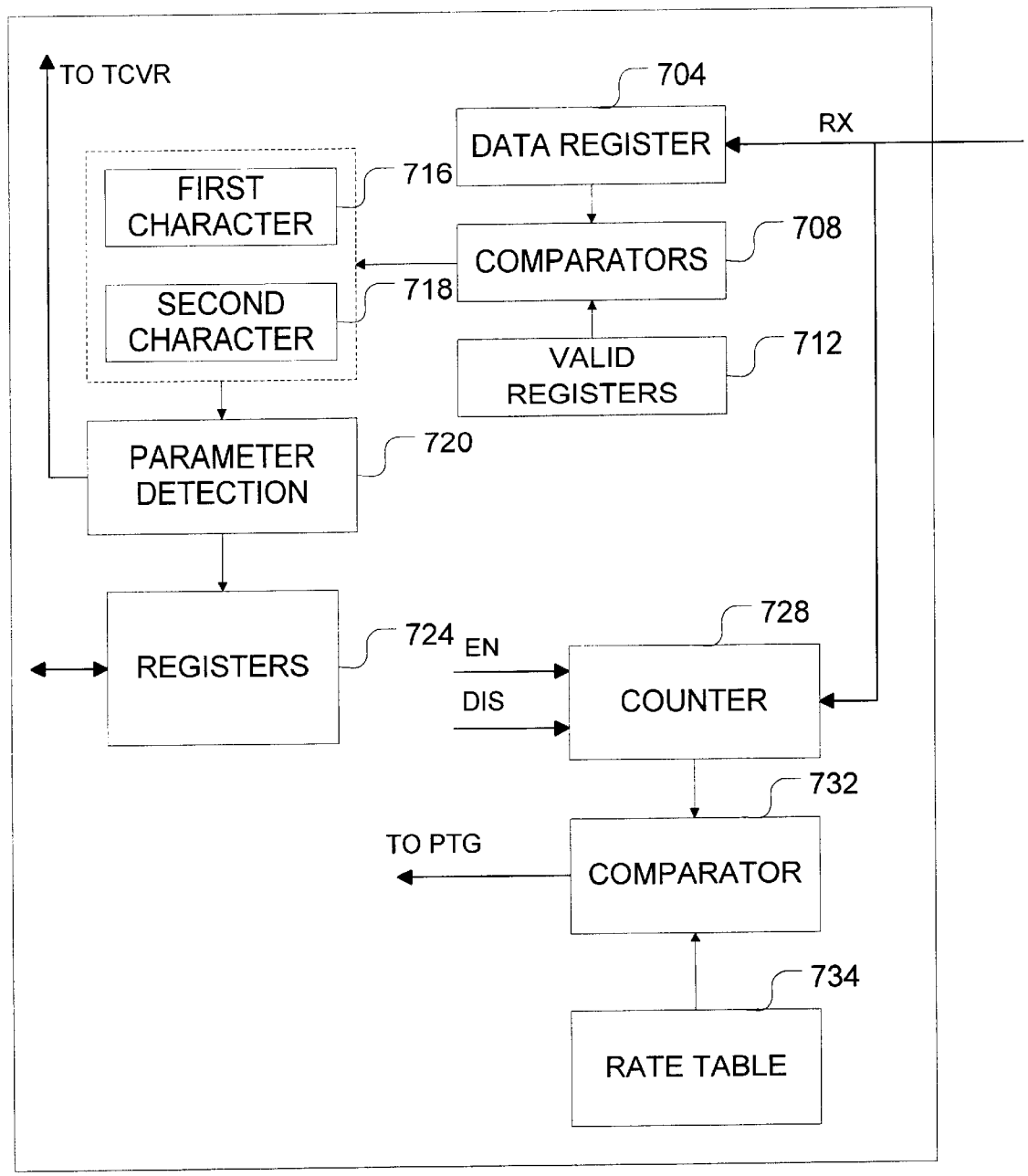
FIG. 7 is a block diagram illustrating an example implementation of parameter detection module 108 according to one embodiment of the invention.

FIG. 7 is a block diagram illustrating this example configuration. In the example illustrated in FIG. 7, there are two primary sections of parameter detection module 108: A first section to detect the data rate or baud rate of the communication, and a second section to detect other communication parameters. Each of these sections are now described.

The first section discussed is the data rate or baud rate detection section. As described, in one embodiment, the data rate determination is done by counting the number of transitions of the reference clock signal that occur during the bit time of the incoming data signal. Specifically, in one embodiment, the number of transitions of a 3.9 MHz clock CLK are counted during the bit time of a start bit in the received communication.

Thus, illustrated in FIG. 7, is a counter 728 configured to receive the communication, and further configured to be enabled on the falling edge of the start bit (EN pin) and disabled on the rising edge of the start bit (DIS pin). Thus, counter 728 counts the number of clock CLK transitions that occur while counter 728 is enabled.

The comparator 732 compares the count value from counter 728 to rates found in a rate table 734. From this comparison, comparator 732 determines the data rate of the communication received and provides this information to precision time generator 112 such that the system can be set up for the appropriate data rate. Rate table 734 can be configured to store one or more valid values, or ranges of values, for each of the anticipated valid data rates. Rate table 734 can be hard configured, or software programmable such that the values in the table can be reconfigured for various applications or as communication parameters change over time.

As described above, once the data rate is determined, subsequent bits in the received data stream are evaluated to determine whether a valid character or character sequence is received. Specifically, in the embodiment illustrated in FIG. 7, the received bit stream for the first two characters is compared with possible valid character data sequences to determine additional parameters of the communication. As such, in this illustrated embodiment, a data register 704 is provided. Data register 704 includes a series of one or more registers that can be used to present one or more of the received bits in a character to one or more comparators 708.

Comparators 708 compare the presented bits in the received data stream to bits in valid registers 712 to determine whether a valid character has been received. In one embodiment, valid register 712 includes the possible sequences of valid characters that can be received. Once a valid first character is detected, its bit sequence is stored in a first character register 716. Likewise, once a second valid character is detected, its bit sequence is stored in second character register 718.

The valid first and second characters are used by parameter detection circuit 720 to detect or determine the communication parameters. The parameters are provided to the receiver/transmitter so that the receiver/transmitter can be set up to handle the communication being established. Additionally, register 724 can be provided to make information available to the processor. Registers 724 can include, for example, registers such as a control register, a status register, a failure register, a data rate register, and other registers as discussed above or as would be useful in making information available to the processor.

Although one example configuration of parameter detection module 108 has been described and illustrated with reference to FIG. 7, it will become apparent to one of ordinary skill in the art after reading this description that alternative configurations or implementations of parameter detection module 108 can be realized.

According to another aspect of the invention, in one embodiment, the DTE can be implemented using, for example, a conventional PC in communication with the processor-based system via a USART or other receiver transmitter. In this application, according to one embodiment, after the AT command has been received and decoded, the parameter detection circuit sends a reply message to the DTE such as, for example an OK message. Once the DTE has received the OK reply message, the DTE may desire to send another AT command. Depending on the software package used in the DTE, the amount of time delay built into the period between receipt of the OK reply and initiation of a subsequent AT command can be very short. As such, it may be desirable to re-enable parameter detection module 108 as soon as the reply message has been sent to the DTE.

Figure 9:
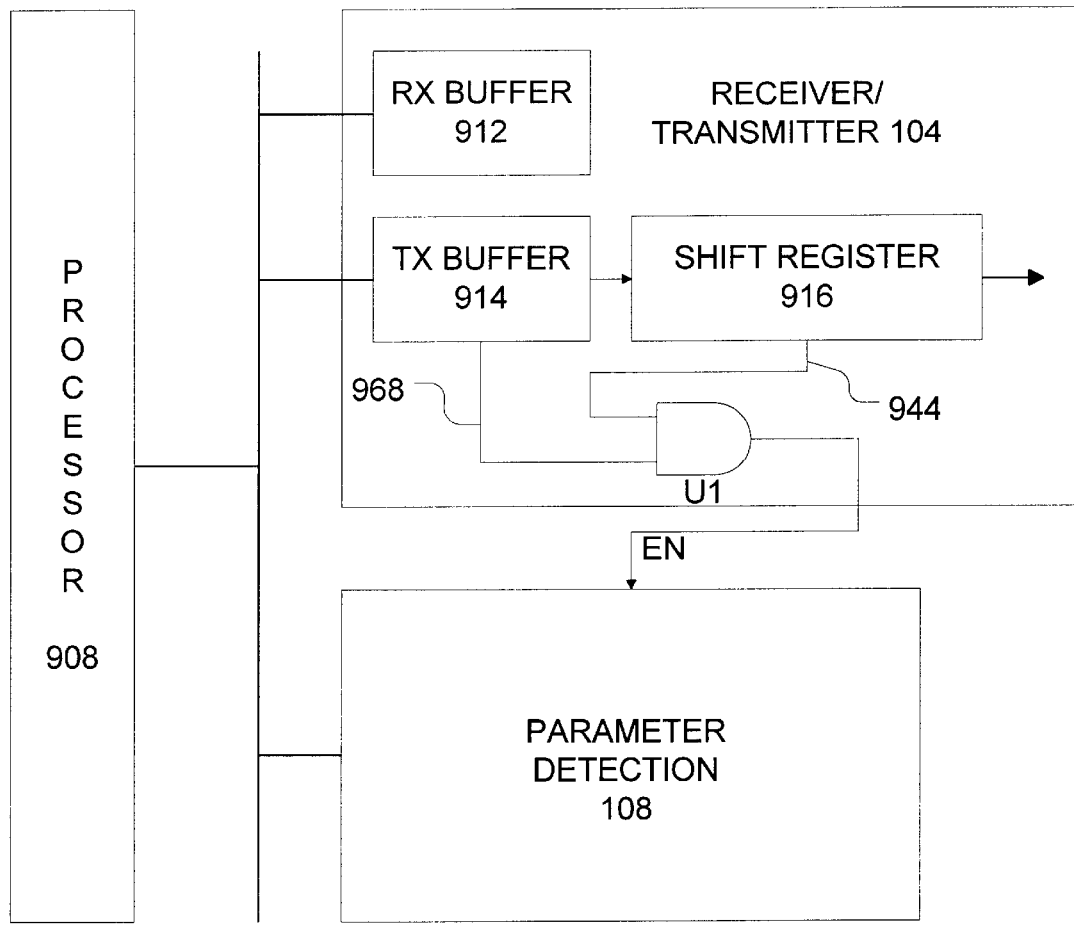
FIG. 9 is a diagram illustrating an example implementation of a reset circuit according to one embodiment of the invention.

To accomplish this, the receiver/transmitter 104 provides a reset or enable signal (EN) to parameter detection module 108 as soon as a communication is complete. When the EN pulse is true, it enables the parameter detection module 108. FIG. 9 is a diagram illustrating an example implementation of a reset circuit according to one embodiment of the invention. Referring now to FIG. 9, characters for transmission from processor 908 to the DTE are first buffered in a TX buffer 914. Because the characters are provided to buffer 914 in parallel, buffered characters loaded into shift register 916 for transmission to the DTE across a serial link.

In one embodiment, shift register 916 creates an underrun signal 944 each time a current byte finishes transmission (i.e., has been shifted out of the shift register). To ensure that the last character has been sent before re-enabling the parameter detection module 108, enable signal EN is not set true unless both TX buffer 914 and shift register 916 have sent the last character. Therefore, in one embodiment, signal 944 is AND'ed (gate U1) with a signal 968 indicating that buffer 914 is empty (i.e., has no more character to transmit via shift register 916). In one embodiment, the EN pulse can also be used to disable receiver/transmitter 104 transmit and receive paths and enable hardware loopbacks.

Because this feature may not be needed in every application, in one embodiment a control bit is added to the registers in parameter detection module 108 and receiver/transmitter 104 to allow the processor to enable or disable this feature. In one embodiment, this bit is provided as Bit 5 of the control register discussed above.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for detecting and configuring for one or more parameters of a communication between a processor-based system, having at least one processor, and another entity, comprising:

a receiver/transmitter configured to receive a communication from the processor and provide said communication to said other entity, and to provide a communication from said entity to said processor;

a precision time generator configured to generate one or more timing signals from a reference clock signal, wherein said one or more generated timing signals provide the receiver/transmitter a clock with which to sample received data and with which to output transmitted data; and a parameter detection circuit, forming part of the processor-based system but distinct from the processor and not itself a processor, configured to detect the receipt of a valid communication from the entity to the processor, to determine from at least a portion of the communication the data rate thereof, and one or more other parameters governing the format of the communication;

wherein said parameter detection circuit is further configured to set up the precision time generator to provide a timing signal at the determined rate to sample data associated with said valid communication, and to configure said receiver/transmitter with one or more of the determined parameters governing the format of the communication;

and wherein said parameter detection circuit is further configured to be disabled after or upon a valid parameter detection, and to be re-enabled at a later time.

2. The system of claim 1, wherein said communication conforms to AT modem protocols, and wherein said detected data rate is one of a plurality of baud rates, and wherein said other parameters comprise at least one of the group of word length, parity, and stop bits.

3. The system of claim 1, wherein said receiver/transmitter is at least one of a USART or a UART.

4. A system for detecting one or more parameters of a communication being established between a processor-based system, comprising a processor, and another entity, and for configuring a receiver to accept the communication:

a data rate detection circuit, forming part of the processor-based system but distinct from the processor and not itself a processor, configured to receive data pertaining to the communication and to determine therefrom a data rate of the communication being established;

a character detection circuit, forming part of the processor-based system but distinct from the processor and not itself a processor, configured to receive one or more characters pertaining to the communication, to determine whether the one or more received characters are one or more of a set of possible valid characters for the communication being established, and to determine one or more communication parameters governing the format of the communication based on the received characters; and a timing circuit configured to provide one or more timing signals to the receiver responsive to the determined data rate;

wherein said character detection circuit configures the receiver to accept the communication with one or more of the determined communication parameters;

and wherein said data rate detection circuit comprises:

a counter configured to count reference clock pulses during a bit time of said received data; and a comparator configured to compare a count value of said counter with one or more stored reference count values correlating one or more ranges of the count value each with a data rate to determine the date rate of the communication being established.

5. The system of claim 4, wherein said communication being established is an AT compatible communication, and said bit of received data used to determine the data rate is a start bit.

6. The system of claim 4, wherein said data rate is a baud rate of an AT compatible communication.

7. A system for detecting one or more parameters of a communication being established between a processor-based system and another entity, the processor-based system comprising a processor, and for configuring a receiver to accept the communication;

a data rate detection circuit, forming part of the processor-based system but distinct from the processor and not itself a processor, configured to receive data pertaining to the communication and to determine therefrom a data rate of the communication being established;

a character detection circuit, also forming part of the processor-based system but distinct from the processor and not itself a processor, configured to receive characters pertaining to modem commands, to determine whether the received characters are one or more of a set of possible valid characters for the communication being established, and to determine one or more communication parameters governing the format of the communication based on the received characters; and a timing circuit configured to provide one or more timing signals to the receiver responsive to the determined data rate;

wherein said character detection circuit configures the receiver to accept the communication with one or more of the determined communication parameters; and wherein said character detection circuit comprises:

a register configured to receive one or more data bits of at least one character;

a comparator configured to compare said received data bits with data bits of one or more possible valid characters to determine whether one or more valid characters have been received; and a register accessible by the processor for storing said one or more received characters if said one or more received characters are valid characters for the communication being established.

8. The system of claim 7, further comprising a second register accessible by the processor for storing a second received character if said second received character is a valid character for the communication being established.

9. The system of claim 7, further comprising means for determining communication parameters from said received valid character and for providing said parameters to the communication receiver.

10. A method of detecting one or more parameters of a communication being established between a processor-based system, comprising a processor, and another entity, comprising the steps of:
  determining, using a data rate detection circuit forming part of the processor-based system but distinct from the processor and not itself a processor, from at least a portion of a transmission between the system and entity a data rate of the communication being established by counting a reference clock signal during a bit time of a predetermined data bit of the communication and comparing the count value with one or more stored reference count values correlating one or more ranges of the count value each with a data rate to determine the data rate of the communication being established;
  comparing, using the data rate detection circuit, bit sequences of at least one of first and second characters received in the communication with bit sequences of a plurality of possible valid characters to determine whether a valid character has been received;
  providing one or more timing signals to a receiver responsive to said determined data rate;
  if one or more valid characters have been received, determining one or more communication parameters governing the format of said communication based on one or more of said received valid characters; and
  configuring the receiver with one or more of said determined communication parameters.

11. The method of claim 10, wherein said communication being established is an AT compatible communication, and said bit of received data used to determine the data rate is a start bit.

12. The method of claim 10, wherein said data rate is a baud rate of an AT compatible communication.

13. A system for detecting one or more parameters of a communication being established between a processor-based system, comprising a processor, and another entity, comprising:
  means, forming part of the processor-based system but distinct from the processor and not itself a processor, for determining from at least a portion of a transmission between the system and entity a data rate of the communication being established, the means for determining comprising:
    means for counting a reference clock signal during a bit time of a predetermined data bit of the communication; and
    means for comparing the count value with one or more stored reference count values correlating one or more ranges of the count value each with a data rate to determine the data rate of the communication being established;
  means for providing one or more timing signals to a precision time generator responsive to said determined data rate;
  means for determining whether one or more valid characters have been received;
  means for determining one or more communication parameters governing the format of the communication being established based on one or more received valid characters; and
  means for configuring a receiver with one or more of said determined communication parameters.

14. The system of claim 13, wherein said means for determining communication parameters comprises:
  means for comparing bit sequences of at least one of first and second characters received in the communication with bit sequences of a plurality of possible valid characters.

15. The system of claim 13, wherein said communication being established is an AT compatible communication, and said bit of received data used to determine the data rate is a start bit.

16. The system of claim 13, wherein said data rate is a baud rate of an AT compatible communication.

17. The system of claim 13, further comprising means for programming a precision time generator to output a timing signal corresponding to the data rate determined by said means for determining a data rate of the communication.

18. A communication system, comprising:
  a first processor-based system, comprising a processor, having a modem for communication with a second processor-based system;
  a parameter detection circuit, forming part of the first processor-based system but distinct from the processor and not itself a processor, configured to detect from at least a portion of a transmission between the first and second systems one or more of the parameters governing the format of a communication being established between said first and second processor-based systems, said parameter detection circuit comprising:
    a circuit module configured to determine whether one or more valid characters have been received;
    a circuit module configured to determine one or more communication parameters governing the format of the communication being established based on one or more received valid characters; and
    a circuit module configured to program a receiver/transmitter with one or more of said determined communication parameters; and
  a control register accessible by the processor in the first processor-based system configured to allow this processor to control whether it is interrupted by the parameter detection circuit upon the occurrence of a failure condition.

19. The system of claim 18, further comprising a circuit module configured to determine a data rate of the communication being established.

20. The system of claim 19, wherein said circuit module configured to determine a data rate of the communication comprises:
  a counter configured to count a reference clock signal during a bit time of a predetermined data bit of the communication; and
  a comparator configured to compare the count value one or more stored reference count values to determine the data rate of the communication being established.

21. The system of claim 18, wherein said circuit module configured to determine communication parameters comprises:
  a comparator configured to compare bit sequences of at least one of first and second characters received in the communication with bit sequences of a plurality of possible valid characters.

22. A wireless communication handset, comprising:
a processor;
a receiver/transmitter;
a parameter detection circuit distinct from said processor and not itself a processor configured to detect the parameters governing the format of a communication being established between said handset and another entity, said parameter detection circuit comprising:
  a circuit module configured to determine whether one or more valid characters have been received;
  a circuit module configured to determine one or more communication parameters governing the format of the communication being established based on one or more received valid characters; and
  a circuit module configured to program a receiver/transmitter with one or more of said determined communication parameters; and
a status register distinct from but accessible by the processor for indicating status of the parameter detection by the parameter detection circuit.

23. The system of claim 22, further comprising a circuit module configured to determine a data rate of the communication being established.

24. The system of claim 22, wherein said means for determining a data rate of the communication comprises:
  a counter configured to count a reference clock signal during a bit time of a predetermined data bit of the communication; and
  a comparator configured to compare the count value one or more stored reference count values to determine the data rate of the communication being established.

25. The system of claim 22, wherein said means for determining communication parameters comprises:
  a comparator configured to compare bit sequences of at least one of first and second characters received in the communication with bit sequences of a plurality of possible valid characters.

26. The system of claim 22, further comprising a reset circuit configured to reset said parameter detection circuit when a reply message has been sent from the receiver/transmitter.

27. A communication system, comprising:
a first processor-based system, comprising a processor, having a modem for communication with a second processor-based system,
a parameter detection circuit, forming part of the first processor-based system but distinct from the processor and not itself a processor, configured to detect one or more parameters governing the data rate and format of a communication being established between said first and second processor-based systems, said parameter detection circuit comprising:
  a circuit module configured to determine from at least a portion of a communication between said systems a data rate of the communication being established;
  a circuit module configured to determine whether one or more valid characters have been received;
  a circuit module configured to determine one or more communication parameters governing the format of the communication being established based on one or more received valid characters; and
  a circuit module configured to program a receiver/transmitter with one or more of said determined communication parameters;

a timing circuit configured to provide one or more timing signals to said receiver/transmitter responsive to said determined data rate; and
a reset circuit configured to reset said parameter detection circuit when a reply message has been received.

28. A system for determining and responding to one or more parameters of a communication between first and second entities, the first entity comprising a processor-based system including a processor, comprising:
  a receiver/transmitter configured to communicate data between the entities;
  a timing generator configured to generate one or more timing signals for use by the receiver/transmitter in receiving and transmitting data;
  a parameter detection circuit, forming part of the processor-based system but distinct from the processor and not itself a processor, configured to (1) determine, from at least a portion of a communication between said entities, one or more parameters of the communication including data rate; (2) configure the timing generator responsive to said determined data rate to provide one or more suitable timing signals to said receiver/transmitter; and (3) configure said receiver/transmitter with one or more of said determined communication parameters which govern the format of said communication; and
  a failure status register accessible by at least one of the entities for indicating, upon or after the occurrence of a failure condition in parameter detection, one or more causes of the failure condition.

29. A method of determining and responding to one or more parameters of a communication between first and second entities, the first entity comprising a processor-based system including a processor, comprising the steps of:
  determining, in a parameter detection circuit forming part of the processor-based system but distinct from the processor and not itself a processor, from at least a portion of a communication between said entities, one or more parameters of the communication including data rate and one or more parameters governing the format of the communication;
  configuring a timing generator responsive to said determined data rate to provide one or more suitable timing signals to a receiver/transmitter;
  configuring the receiver/transmitter using one or more of said determined communication parameters which govern the format of said communication between said first and second entities;
  disabling the parameter detection circuit upon or after a valid parameter detection; and
  re-enabling the parameter detection circuit at a later time.

30. A system for determining and responding to one or more parameters of a communication between first and second entities, the first entity comprising a processor-based system including a processor, comprising:
  a receiver/transmitter configured to communicate data between the entities;
  a parameter detection circuit, forming part of the processor-based system but distinct from the processor and not itself a processor, configured to (1) determine, from at least a portion of a transmission between said entities, one or more parameters governing the format of the communication; and (2) configure said receiver/transmitter with one or more of said determined communication parameters;

a status register distinct from but accessible by the processor for indicating status of parameter detection by said parameter detection circuit; and a control register distinct from but accessible by the processor for allowing the processor to at least partly control parameter detection or said parameter detection circuit.

31. A method of determining and responding to one or more parameters of a communication between first and second entities, the first entity comprising a processor-based system including a processor, comprising the steps of:

determining, using a parameter detection circuit forming part of the processor-based system but distinct from the processor and not itself a processor, from at least a portion of a transmission between said entities, one or more parameters governing the format of the communication;

configuring a receiver/transmitter using one or more of said determined communication parameters; and indicating to the processor, through a status register distinct from but accessible by the processor, the status of said parameter determination.

32. A system for facilitating communication between first and second entities, the first entity comprising a processor-based system including a processor, comprising:

a receiver/transmitter configured to receive and transmit communications between said entities; and a parameter detection circuit, forming part of the processor-based system but distinct from the processor and not itself a processor, configured to detect one or more parameters governing the format of a communication between said entities, and configure said receiver/transmitter responsive thereto;

wherein said parameter detection circuit is further configured to be disabled after or upon a detection of said one or more parameters, and to be re-enabled at a later time.

33. A communication system for facilitating communication between first and second entities, the first entity comprising a processor-based system including a processor, the system comprising:

a receiver/transmitter configured to receive and transmit communications between said entities;

a parameter detection circuit, forming part of the processor-based system but distinct from the processor and not itself a processor configured to detect one or more parameters governing the format of a communication between said entities, and configure said receiver/transmitter responsive thereto; and a control register accessible by at least one of the entities and configured to allow this entity to control whether it is interrupted by the parameter detection circuit upon the occurrence of a failure condition.

34. A communication system for facilitating communication between first and second entities, the first entity comprising a processor-based system including a processor, the system comprising:

a receiver/transmitter configured to receive and transmit communications between said entities;

a parameter detection circuit, forming part of the processor-based system but distinct from the processor and not itself a processor, configured to detect one or more parameters governing the format of a communication between said entities, and configure said receiver/transmitter responsive thereto; and a failure status register accessible by at least one of the entities for indicating, upon or after the occurrence of a failure condition in parameter detection, one or more causes of the failure condition.

35. A method of facilitating communication between first and second entities, the first entity comprising a processor-based system including a processor, comprising:

detecting, in a parameter detector circuit forming part of the processor-based system but distinct from the processor and not itself a processor, one or more parameters governing the format of a communication between said entities;

configuring a receiver/transmitter responsive to one or more of the detected parameters;

disabling said parameter detection circuit after or upon a detection of said one or more parameters; and re-enabling said parameter detection circuit at a later time.

36. A method of facilitating communication between first and second entities, the first entity comprising a processor-based system including a processor, the method comprising:

detecting, in a parameter detector circuit forming part of the processor-based system but distinct from the processor and not itself a processor, one or more parameters governing the format of a communication between said entities;

configuring a receiver/transmitter responsive to one or more of the detected parameters; and indicating, upon or after the occurrence of a failure condition in parameter detection, in a failure status register accessible by the processor, one or more causes of the failure condition.

37. A method of facilitating communication between first and second entities, the first entity comprising a processor-based system including a processor, comprising:

a step for detecting in a parameter detector circuit, forming part of the processor-based system but distinct from the processor and not itself a processor, one or more parameters governing the format of a communication between said entities;

a step for configuring a receiver/transmitter responsive to one or more of the detected parameters;

a step for disabling said parameter detection circuit after or upon a detection of said one or more parameters; and a step for re-enabling said parameter detection circuit at a later time.

* * * * *